United States Patent [19]
Hater et al.

[11] Patent Number: 5,753,494
[45] Date of Patent: May 19, 1998

[54] METHOD AND APPARATUS FOR TREATING CONTAMINATED SOILS WITH OZONE

[75] Inventors: Gary R. Hater; Roger B. Green, both of Cincinnati, Ohio

[73] Assignee: Waste Management, Inc., Oak Brook, Ill.

[21] Appl. No.: 536,428

[22] Filed: Sep. 29, 1995

[51] Int. Cl.$^6$ .................................................. B09B 3/00
[52] U.S. Cl. ..................... 435/262.5; 405/128; 405/258; 435/264; 435/290.1; 435/300.1
[58] Field of Search .................. 435/262.5, 264, 435/289.1, 290.1, 300.1; 405/128, 258; 210/610

[56] References Cited

U.S. PATENT DOCUMENTS

| | | | |
|---|---|---|---|
| 2,703,247 | 3/1955 | Wolf et al. | 292/220 |
| 3,920,547 | 11/1975 | Garrison et al. | 210/63 |
| 4,029,578 | 6/1977 | Turk | 210/63 |
| 4,076,617 | 2/1978 | Bybel et al. | 210/19 |
| 4,098,691 | 7/1978 | Filby | 210/29 |
| 4,178,239 | 12/1979 | Lowther | 210/18 |
| 4,487,699 | 12/1984 | Long, Jr. | 210/760 |
| 4,537,599 | 8/1985 | Greenwald, Sr. | 44/1 SR |
| 4,719,763 | 1/1988 | Tietze | 62/186 |
| 4,849,360 | 7/1989 | Norris et al. | 435/264 |
| 4,850,745 | 7/1989 | Hater et al. | 405/258 |
| 5,039,415 | 8/1991 | Smith | 405/128 |
| 5,067,852 | 11/1991 | Plunkett | 405/128 |
| 5,205,927 | 4/1993 | Wickramanayake | 210/170 |
| 5,269,943 | 12/1993 | Wickramanayake | 210/747 |
| 5,384,048 | 1/1995 | Hazen et al. | 435/262.5 |

*Primary Examiner*—George Yeung
*Attorney, Agent, or Firm*—McDonnell Boehnen Hulbert & Berghoff

[57] ABSTRACT

A method and an apparatus for continuously treating an organic compound contaminated soil heap with an ozone containing gas using a closed loop gas recycle system.

19 Claims, 3 Drawing Sheets

METHOD AND APPARATUS FOR TREATING CONTAMINATED SOILS WITH OZONE

BACKGROUND OF THE INVENTION

(1) Field of the Invention

This invention concerns a method and apparatus for treating contaminated soil with ozone wherein ozone is injected into a soil heap and reacts with at least some hydrocarbon contaminants in the soil and wherein any unreacted ozone and reaction products are withdrawn from the contaminated soil and recovered and recycled.

(2) Description of the Art

Remediation of contaminated soils is an ever-increasing problem. Soil contamination has typically been caused by spills, dumping of hazardous liquids, leakage from underground storage tanks, etc., where the contaminants are retained by the subsurface soil. An immediate health threat is posed when these contaminants descend hydrodynamically into the groundwater. Additionally, the balance of the ecosystem is severely disturbed as surrounding plant and animal life is directly affected by the contaminated soil. It is thus desirable to develop methods and apparatuses to remove contaminants from the contaminated soil.

Often, contaminated soil is excavated to immediately remove and reduce the source of contamination at a site where a discharge of volatile organic contaminants has occurred. Excavation is required when immediate removal and management of the contaminated soil is either required by federal, state or municipal regulations, or is determined to be required as an immediate or best response effort to reduce the source of the contamination. Examples of situations where excavation of the soil is implemented include underground storage tank removals, emergency responses to accidental spills of hazardous materials, etc.

The primary method of management of contaminated soil resulting from underground storage tank and contamination source removals has been and is presently off-site disposal at a landfill.

Another method to treat contaminated soils is to add a reactant to the soil that consumes or destroys the contaminants. Such reactants include ozone and hydrogen peroxide. Ozone is an unstable form of oxygen that has been used in waste water treatment for some time. In most applications, ozone has been used to destroy or treat organic wastes present in aqueous media as described in U.S. Pat. Nos.: 2,703,247; 3,920,547; 4,029,578; 4,076,617; 4,098,691; 4,487,699; 4,537,599; 4,619,763; and in Japanese Patents: 4,500; 43,304.

Application of aqueous ozone solutions to treat contaminated soil is difficult because of the relatively slow permeation of fluid through soils coupled with the rapid decomposition of ozone. For example, if aqueous ozone is applied at a 2-atm/m pressure gradient to soil having a permeability of 0.1 m/day (e.g., clay-loam soil), the liquid front will move only at a velocity of 0.16 m/hr. Because of these low flow velocities, the practical utility of aqueous ozone to treat contaminated soils is limited.

Wickramanayake's U.S. Pat. Nos: 5,269,943, 5,205,927 and Later's U.S. Pat. No. 5,259,962 both investigated complete and partial oxidation of hydrocarbons in soil and other solid media using gaseous ozone. Wickramanayake teaches that ozone is unstable unless it is acidified prior to use and teaches methods of stabilizing ozone in acid, treating soil above ground (ex-situ) in a vessel, and neutralizing the ozone with sodium thiosulfate ($Na_2S_2O_3$) as it leaves the vessel. The stabilization process allows ozone to exist for 10,000 seconds or longer at a pH of four.

The Wickramanayake reference suggests a stability of at least 10 seconds when ozone is not acidified and it teaches that treatment of soil contaminants with ozone is impossible without stabilization because of the time of travel through the soil. U.S. Pat. No. 5,259,962 to Later describes an above ground soil treatment system using ultraviolet light, hydrogen peroxide and ozone. The system mixes and augers the soil for chemical oxidation of a petroleum contaminant fraction. Hydrogen peroxide and ultraviolet light are used as catalysts to disassociate the ozone, forming hydroxyl (OH) radicals. The hydroxyl radicals oxidize the organic molecules in the soil.

SUMMARY OF THE INVENTION

It is an object of this invention to provide a process and apparatus for remediating soils contaminated with hydrocarbon compounds using ozone gas.

It is another object of this invention to provide a process and apparatus for remediating contaminated soils in which expensive, unreacted ozone gas is recycled.

It is still another object of this invention to provide a process and apparatus for treating contaminated soils with ozone gas that eliminates the need to stabilize the ozone.

It is still another object of this invention to provide a method and apparatus for treating contaminated soil that eliminates the need to inject additives along with the ozone such as hydrogen peroxide to promote the production of hydroxyl radicals.

It is still another object of this invention to promote the bioremediation of biologically refractive molecules such as polycyclic aromatic hydrocarbons (PAH's) by treating soil containing PAHs' in a soil heap prior to or following bioremediation.

Yet another object of this invention is to chemically destroy and/or oxidize non-biodegradable organic molecules.

Still another object of this invention is a process for remediating contaminated soil that does not vent gases into the atmosphere.

In one embodiment, this invention is a method for treating contaminated soil. The method begins by forming contaminated soil into a soil heap that covers one or more ozone recirculation piping systems and one or more vacuum withdrawal piping systems. A first ozone containing gas stream is injected into the soil heap using one or more ozone recirculation piping systems. A second gas stream is withdrawn from the soil heap using one or more ozone vacuum withdrawal piping systems. The ozone in the first ozone containing gas stream permeates the soil heap where it destroys hydrocarbon and other carbon based soil contaminants thereby causing the concentration of ozone in the first ozone containing gas stream to be higher than the concentration of ozone in the second gas stream. The second gas stream is admixed with ozone from a pressurized ozone source to give the first ozone containing gas stream which, in turn, is injected into the soil heap via the ozone recirculation piping system.

This invention is also an apparatus useful for decomposing organic contaminants in a soil heap. The apparatus consists of a soil heap including soil and organic contaminants covering at least one ozone recirculation piping system. Each ozone recirculation piping system has an inlet associated with an ozone recirculation manifold and a plurality of outlet perforations. All of the outlet perforations are located within the soil heap. The contaminated soil heap also covers at least one vacuum withdrawal piping system. Each vacuum withdrawal piping system has a plurality of inlet perforations located inside the soil heap and an outlet associated with a vacuum withdrawal manifold. The vacuum withdrawal manifold is in turn associated with the inlet of a recirculation blower. The recirculation blower also has an outlet that can be associated with a gas recirculation header. A pressurized source of ozone gas is associated with the gas recirculation header and the outlet of the gas recirculation header is associated with the ozone recirculation manifold.

DESCRIPTION OF THE DRAWINGS

There is shown in the drawings a presently preferred embodiment of the process for treating contaminated soils with ozone of this invention wherein like numerals in the various Figures pertain to like elements and wherein.

DESCRIPTION OF THE CURRENT EMBODIMENT

The present invention relates to a method and apparatus for remediating soil contaminated with organic compounds using ozone gas in a closed loop gas circulation system prior to or following soil heap bioremediation. This invention is most useful for treating and remediating soil contaminated with hazardous organic compounds such as petroleum based hydrocarbons including heavy, relatively non-volatile hydrocarbons as well as light, relatively volatile hydrocarbons. Examples of heavy, non-volatile hydrocarbons that are partially or totally remediated by gaseous ozone are coal tar, crude oil, creosote, sludge, fuel oil, refinery vacuum bottoms, motor oil, #2 diesel oil, polycyclic aromatics (PAHs), and other, equally heavy, i.e., high boiling point non-volatile hydrocarbons. Examples of light, relatively volatile hydrocarbons that are at least partially or totally remediated by the process and apparatus of this invention using gaseous ozone include diesel fuel, kerosene, gasoline, and components of gasoline and other light hydrocarbons such as benzene, xylenes, naphtha, and other low boiling point straight chained, branched and mono- and poly-cyclic hydrocarbons.

The process of this invention begins by using earthmoving equipment such as excavators and bulldozers to distribute soil contaminated with hazardous organic compounds into lifts. The contaminated soil may be mixed and irrigated with nutrients and microorganisms grown in batch cultures before lift construction and before treatment with ozone. Soil heap 10 preferably comprises an elongated trapezoidal pile of contaminated soil consisting of a plurality of soil lifts. Soil heap 10 is normally constructed in from about five days to about two weeks. The average size of soil heap 10 is approximately 120 feet by 400 feet by 25 feet. The soil in each pile will be approximately 15,000 cubic yards in volume and weighs about 20,000 tons. The size of each pile can be significantly smaller, or in some cases, larger.

Figure 1:
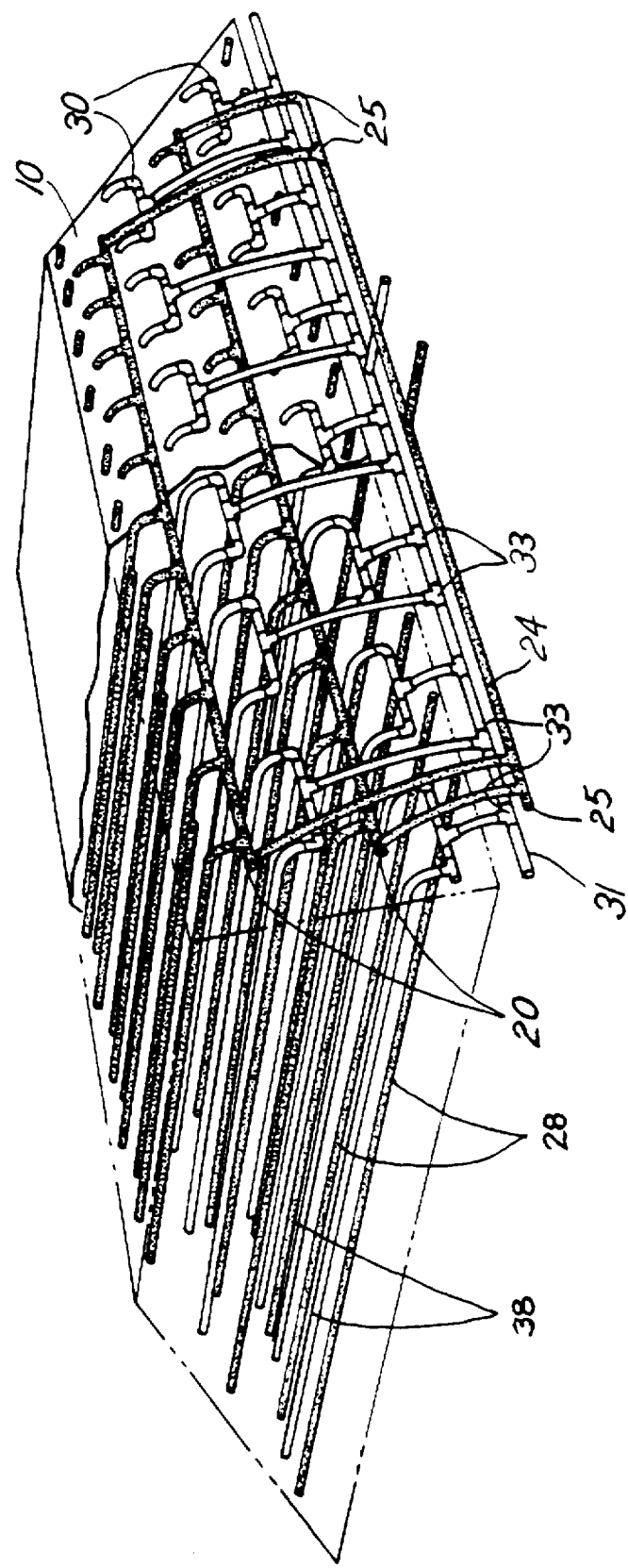
FIG. 1 is a cross-section view of a soil heap associated with a process of this invention depicting a preferred arrangement of the ozone recirculation piping system and the ozone vacuum withdrawal piping system.

Following construction of a first three to four feet thick bottom first lift, an ozone recirculation piping system 20, comprising perforated piping, is placed on top of the first soil lift. Next, a second soil lift is piled above ozone recirculation piping system 20 and a vacuum withdrawal piping system 30 is placed on top of the second soil lift. Additional soil lifts are constructed and the type of piping system placed on each lift alternates on the vertical axis between ozone recirculation piping systems 20, and vacuum withdrawal piping system 30 as is shown in FIG. 1. It is not critical that an ozone recirculation piping system 20 is placed on top of the first soil lift. It can be a vacuum withdrawal piping system 20, instead. What is important is that the two types of piping systems alternate in each subsequent soil lift.

Piping system spacing may be varied depending on the soil type used to construct the lift. A material consisting of on site crushed rock, compost or gravel can be distributed around each pipe to prevent pipe clogging. It is preferred that piping system spacing on the vertical axis is from about 1 to about 15 feet.

Ozone recirculation piping system 20 consists of a plurality of horizontally spaced perforated recirculation pipe legs 28. Recirculation pipe legs 28 are each connected to ozone recirculation manifold 24. Likewise, vacuum withdrawal piping system 30 consists of a plurality of horizontally spaced perforated withdrawal pipe legs 38. Each withdrawal pipe leg 38 is connected to vacuum withdrawal manifold 31. It is preferred that the horizontal spacing between pipe legs 28 and 38 varies from about 3 feet to about 25 feet on the horizontal axis. It is also preferred that perforated pipe legs 28 and 38 are terminated on both sides of the pile at a distance of between 0.5 m and 2.0 m from the edge of the pile. The variation on this length will depend on soil permeability. A typical termination distance is one meter.

The piping used to construct the ozone recirculation piping system and the ozone vacuum withdrawal piping system can be manufactured out of any material that is essentially inert to ozone and to the soil contaminants such as plastic piping or stainless steel piping. It is preferred that the piping used for air, ozone, water and microorganism distribution is high density polyethylene (HDPE) or equivalent piping. The pipes of each piping system include a multitude of perforations to allow ozone containing gas to thoroughly permeate soil heap 10 and to allow ozone, unreacted gases, reaction products, and volatile contaminants to be withdrawn uniformly from soil heap 10. Also, a large number of perforations in the piping systems minimizes the pressure drop across the piping systems caused by introduction of gases into or the withdrawal of gases from soil heap 10.

The ozone recirculation piping systems 20 are strategically located in soil heap 10 to distribute ozone containing gas through the entire soil pile. Uniform ozone distribution is also a function of the proper placement of vacuum withdrawal piping systems 20 in soil heap 10. The preferred alternating vertical layers of ozone recirculation and withdrawal piping systems allow the piping systems to work in unison to distribute ozone containing gas uniformly throughout soil pile 10. Furthermore the construction and distribution of the piping systems in the soil pile allow for reuse of the recirculation and vacuum withdrawal piping systems when soil heap remediation is complete.

As shown in FIG. 1, each ozone recirculation piping system is connected to ozone recirculation manifold 24.

Inlet valves 25 allow for equalization of flow to the ozone recirculation piping system 20 and to individual recirculation pipe legs 28. Each vacuum withdrawal piping system 30 is attached to an ozone vacuum withdrawal manifold 31. Vacuum withdrawal manifold 31 includes outlet valves 33 to equalize the rate of withdrawal of gasses from each vacuum withdrawal pipe system 30 and from individual withdrawal pipe legs 38.

The vacuum withdrawal manifold 31 may be associated with a knockout drum 40 or standpipe for removal of condensate such as water, hydrocarbons, and other condensable materials from the vacuum withdrawal gases. Vacuum withdrawal manifold 31 is attached at one end to inlet 34 of recirculation blower 32 to provide for gas recirculation to soil heap 10. Recirculation blower 32 is sized to provide a recirculation gas flow rate of about 0.01 scfm/ton to 0.20 scfm/ton of soil. Recirculation blower outlet pressure typically ranges between 10" (3.93 cm) and 60" (23.6 cm) of water.

Figure 2:
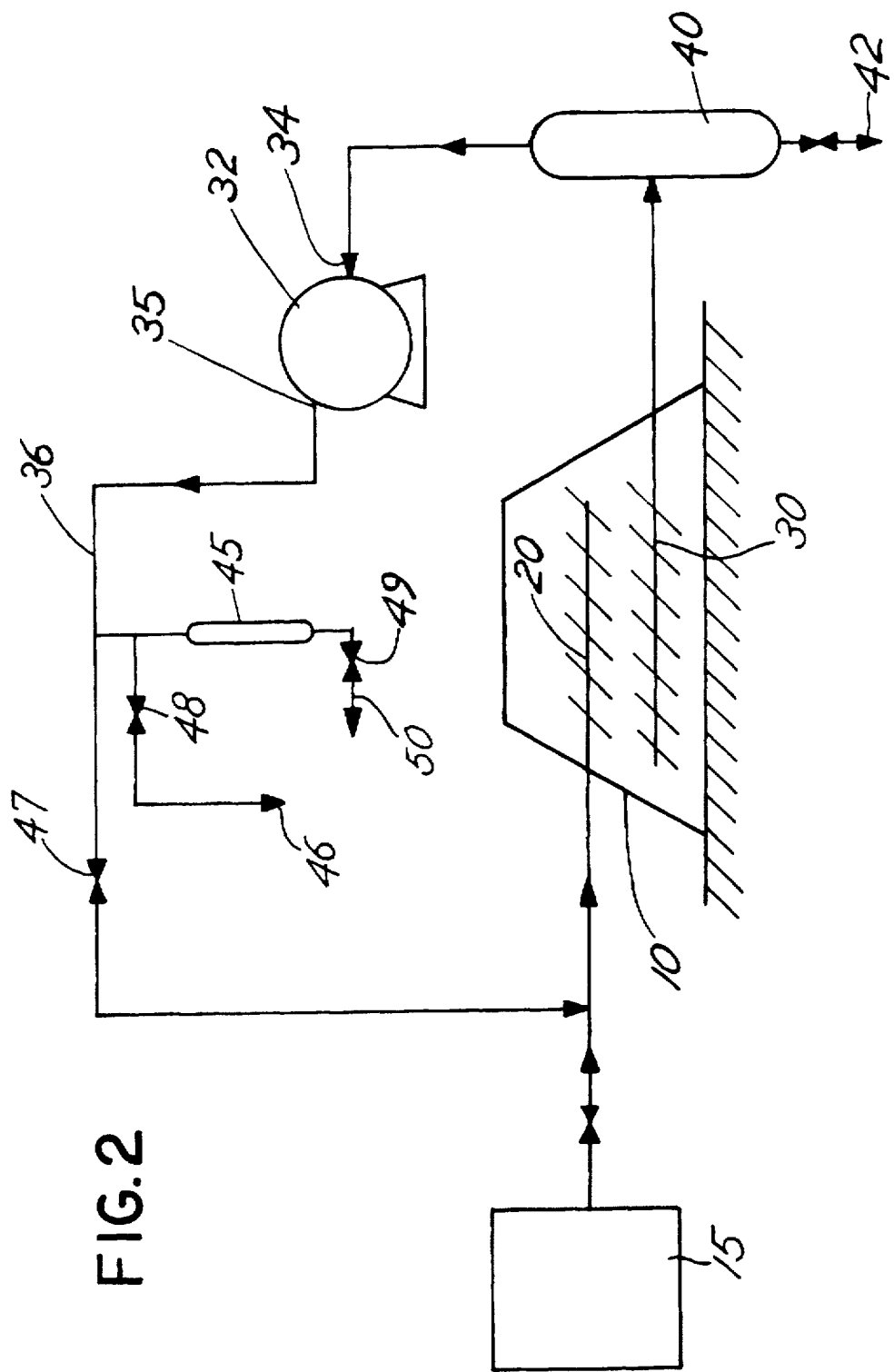
FIG. 2 is a schematic diagram of the basic elements of a process for remediating contaminated soil heaps of this invention.

The purpose of optional knockout drum 40 is to condense condensable gases such as water and volatile organic compounds in the feed gas to recirculation blower 32. The liquid collected in the knockout drum is removed through drain 42 as shown in FIG. 2 and may be used to grow new microorganisms, to add moisture to soil heap 10, or it can be discharged to a water collection system. The non-condensable extracted gases exit knockout drum 40 and then enter the recirculation blower 32 where the vacuum withdrawal gas is pressurized to pressure sufficient to be recirculated into soil heap 10. Pressurization of the vacuum withdrawal gas by recirculation blower 32 heats the recirculated gases that, in turn, warms soil heap 10. The temperature of the recirculation gas exiting recirculation blower 32 is from about 15° C. to about 40° C. and usually about 30° C. warmer than the temperature of the gas entering recirculation blower 32. If the blower is not capable of maintaining soil heap 10 at a temperature above 45° F., then a heater may be added to gas recirculation header 36 or elsewhere in the blower inlet or outlet gases in order to maintain soil temperature above 45° F.

The recirculated gas is discharged from outlet 35 of recirculation blower 32 into ozone recirculation header 36. Ozone, from a pressurized ozone source is injected into recirculation header 36 where it mixes with the circulating recirculation gas discharged from recirculation blower 32 to give a soil heap feed gas that is injected into soil heap 10 via the ozone recirculation piping system. The pressurized ozone source may be an ozone generator 15 or any other source of pressurized ozone. It is preferred that an ozone generator be used to supply ozone for injection into soil heap 10. Once ozone gas is injected into gas recirculation header 36, the combined ozone containing gas feed flows into ozone recirculation manifold 24 where it is distributed to ozone recirculation piping system 20.

The concentration of ozone introduced into the recirculation header 36 from the preferred ozone generator may vary from about 0.1 to about 5 volume percent of the recirculation gas stream composition excluding any residual ozone withdrawn from soil heap 10 by vacuum withdrawal piping system 30 and recirculated. The optimum ozone content of the recirculation gas stream will depend upon the organic carbon content of the contaminated soil. The ozone generator size will depend on the volume of soil and the length and rate of treatment. Ozone generator production rates can vary from 15 lbs./day to 210 lbs./day or more.

Ozone gas may be injected into gas recirculation header 36 continuously or intermittently. The length of time ozone is added to the recirculation gas will vary, as is apparent to one of skill in the art, depending on the concentration of ozone in gas withdrawn from the soil heap, the type, concentration and extent of remediation of the organic contaminants, the soil moisture content, and the time of travel through the soil pile.

Variances in soil type and density will affect the air flow rate within soil heap 10. Inlet valves 25 and outlet valves 33 are associated with ozone recirculation manifold 24 and with ozone vacuum withdrawal manifold 31 respectively and can be adjusted as required to obtain constant and uniform gas flow through soil heap 10. Spigots can be included at low points in the piping system to drain any water and hydrocarbon condensate from the lines.

Under normal operation, the process and apparatus of this invention recirculates 100% of the gases extracted from soil heap 10 which results in zero point source air emissions from the process. The ozone in the gas feed to soil heap 10 partially to totally reacts with the contaminants in soil heap 10. This means the gas injected into soil heap 10 has a higher ozone concentration than in the gas withdrawn from soil heap 10. The gases extracted from the soil heap by vacuum withdrawal piping system 30 may be ozone free or may include some unreacted ozone gas along with air, products of the reaction of ozone with organic carbon compounds, volatile soil contaminants, and water. As the soil remediation proceeds, there will be more and more unreacted ozone in the gas extracted from soil heap 10. Recovering and recycling the extracted gases ensures that no ozone remains unreacted and that no contaminants enter the atmosphere.

A standby vapor-phase carbon emission control system or a commercial ozone destruction unit may be provided for use when needed such as during maintenance of recirculation blower 32. Referring to FIG. 2, the carbon absorption unit 45 is located on vent line 50. Valve 47 in gas recirculation header 36 is closed and valve 49 is opened to allow the venting of some to all gas that is removed from soil heap 10 via carbon absorption unit 45. Carbon absorption unit 45 extracts any volatile hydrocarbons and other undesirable compounds gas before venting the process off gases to the atmosphere. Besides being used in emergencies, the carbon absorption unit and vent system can be used to demonstrate point source air emissions or it can be operated during the remediation of off-site projects.

Since the primary soil contaminants are hazardous petroleum fractions, volatilization of the hydrocarbons is minimized by keeping the soil moist and by covering all contaminated soil not affected by construction or deconstruction activities with a cover to minimize fugitive air emissions, moisture evaporation, loss of passive solar heat, and prevent run-off from contaminated soil during storm events. There is ample air under the cover to allow for adequate soil oxygenation. The soil heap cover may be a natural barrier such as clay or sand, or the cover may be a synthetic barrier such as plastic. It is preferred that the cover is an essentially gas impervious synthetic material.

The perforated piping used in the recirculation and withdrawal piping systems allows for the optional addition of nutrients and water, sufficient to moisten the soil without creating runoff. Microorganisms able to decompose the soil contaminants may be added to soil heap 10 via the perforated piping before ozone recirculation in order to remediate hydrocarbons in an initial remediation step. Alternatively, microorganisms can be added to soil heap 10 once ozone gas remediation becomes inefficient to consume any residual hydrocarbon contaminants and reaction byproducts. Or, microorganisms can be added to soil heap 10 for a period of time between periods of ozone gas addition in order to convert hydrocarbon contaminants into a form more readily destroyed by ozone. The microorganisms, added along with nutrients, decompose hydrocarbon contaminants in the soil. Alternatively, microorganisms and nutrients may be added to soil heap 10 during construction of soil heap lifts.

The process and method of this invention is preferably used in conjunction with a bioremediation process to destroy essentially all organic hazardous contaminants in a soil heap. The process and apparatus of this invention can be used prior to bioremediation to at least partially destroy hazardous organic waste that is refractory to bioremediation. Alternatively, the process and apparatus of this invention can be used after bioremediation of a soil heap to destroy any residual organic hazardous waste not consumed by the bioremediation process.

The invention is illustrated further by the following examples which are not to be construed as limiting the scope of the invention.

EXAMPLE 1

To estimate the air exchange rate at the surface of the pile and to confirm gas retention in a soil heap, a helium gas tracer test was performed on an operating vacuum soil heap configured to recirculate air through the pile. The test was conducted by injecting a pulse of helium gas into the air return line at a rate of 0.85 $m^3$/min. for 10 minutes. The helium content of the air drawn from the pile was monitored with a Marks Helium Detector Model 9820. The helium detector was calibrated with 1.0%, 0.5% and 0.1% helium in air standards. Samples were collected approximately ever 1.5 minutes over a period of two hours. Results are shown in FIG. 3.

Figure 3:
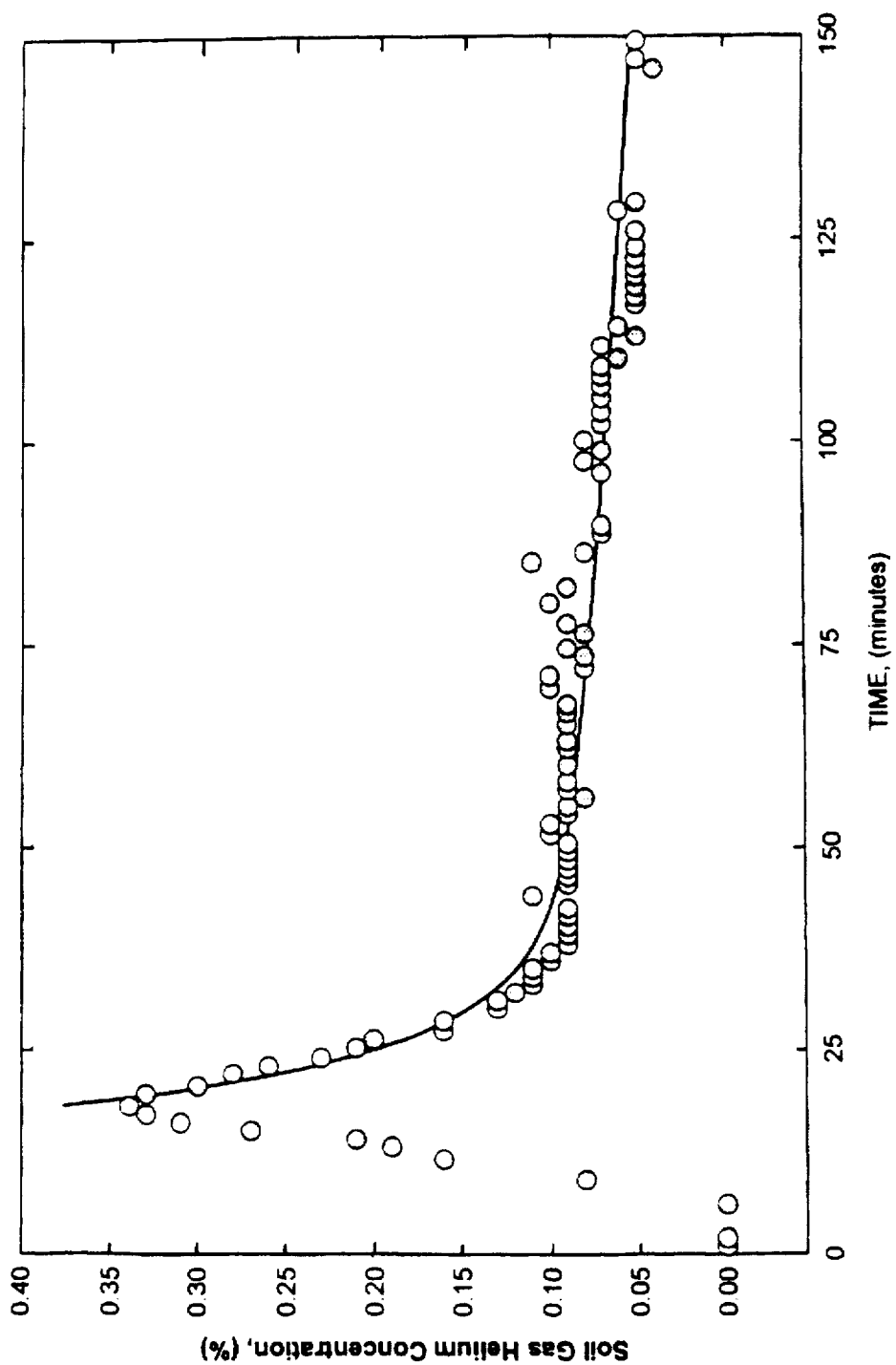
FIG. 3 is a plot of showing the distribution and retention of helium in gases circulating in the closed loop system of this invention.

The initial peak in helium concentration represents the advective mixing of air containing the injected helium with air being displaced from the pore spaces of the pile as air is recirculated. After approximately 50 minutes, a constant, small rate of decay in the helium concentration is observed indicating that helium has been distributed throughout the pore spaces of the soil heap. This period of time is taken to be the empirical retention time for one pore volume. The theoretical retention time, which is the effective pile pore volume/the air flow rate, was calculated to be 99 minutes, assuming the soil porosity of 0.35, a water filled porosity of 0.15, a flow rate of 14.16 $m^3$/min. and a pile volume of 7020 $m^3$. The difference in the theoretical and the empirical values may be attributed to the vacuum and pressure piping configuration of the vacuum heap which would allow for a more rapid equilibration of the helium concentration. Assuming the reduction in measured helium concentrations over time is a function of air flow into and out of the pile, (i.e., helium is not irreversibly absorbed onto soil and the rate of decrease is not a diffusion limited process), the flux of air at the pile surface can be estimated. The exchange of air required to effect the concentration decrease after equilibration is calculated as:

$$J_a = kQ$$

Where $J_a$ is the air flux at pile surface, k is the slope calculated from the linear portion of the curve in FIG. 3 and is equal to $3.43 \times 10^{-4}$, and Q is the volumetric flow rate of the recirculated air. For example, at a flow rate of 14.16 $m^3$/min, $J_a = 0.0048$ $m^3$/min.

This example shows that gas, including an ozone containing gas, can be quickly and uniformly distributed throughout a soil heap and retained for soil remediation purposes.

EXAMPLE 2

This example describes how the process and apparatus of this invention is intended to be used to remediate soil contaminated by coal tar.

Two vacuum heaps containing from 20,000 to 30,000 tons each of coal tar contaminated soil are constructed. Soils are placed on the working floor in three foot high lifts using earthmoving equipment. After a lift is in place, diammonium phosphate fertilizer is spread on the top surface of the lift. The rate of fertilizer addition is based on stoichiometric requirements using a carbon to nitrogen to phosphorus ratio (C:N:P) of 100:5:1. Carbon content, as measured by soil total organic carbon (TOC), will be used to calculate the required amount of fertilizer.

Following application of the diammonium phosphate, a liquid bacterial culture is sprayed onto the soil lift at a rate of approximately 1 gallon per cubic yard of soil. The culture, which contains bacteria selected for their ability to degrade a range of aliphatic and aromatic hydrocarbons, is grown on-site in a thermostatically controlled bioreactor.

After the bacterial culture is applied to the soil, vacuum withdrawal or ozone recirculation piping is placed on top of the lift. Perforated HDPE piping is used. The HDPE pipes will be placed approximately every 12 feet across the surface of each lift. Pipe perforations will end three feet from the edge of each lift. Successive lifts will be constructed in this fashion until the pile reaches a height of between 15 and 18 feet. The overall dimensions of the piles will depend on the amount of undergoing remediation soil.

Aeration piping will be connected by fusion welding to a vacuum or pressure header respectively to form a manifold. Ball valves will be installed on pipes connected to the vacuum header. Upon completion of pile construction, a layer one to three feet thick of clean soil will be placed over the pile.

The prepared soil heap will be aerated by connecting the ozone recirculation manifold to an aeration control unit such as a blower. A line leading from the ozone generator will be connected to the pressure or air return line. Both the aeration control unit and the ozone generation unit are designed for unattended operation for extended periods of time.

An aeration control unit will be used in conjunction with the vacuum heap. The aeration control unit consist of a 7.5 hp positive displacement blower, an air/water separator, NEMA 4 control panel, associated piping and appurtenances, and an in-line electronic air flow meter and temperature probe. The blower is capable of delivering a total air flow of 750 cfm at a pressure of 38 in. of water. An air/water/contaminant knock out drum, constructed of stainless steel is located on the blower inlet and functions to prevent damage to the blower. The knockout drum is equipped with automatic level control shut off and a two inch drain valve.

The ozone generation unit consists of a diesel generator, air compressor, water chiller, air filters, and an ozone generator. The equipment is capable of delivering up to 120 pounds of ozone from air.

The overall objective of this system is to evaluate the effectiveness of combining ozone treatment with a bioremediation process to remediate coal tar contaminated soil. By subjecting the soil heap to ozone treatment followed by biological treatment. The duration of ozone treatment will be based upon weekly selective soil testing for PAHs, pH, and residual ozone in soil gas. As ozone reacts directly and indirectly with soil organic matter including contaminants, a decrease in higher ring PAHs and soil pH, and increase in residual ozone will occur.

Soil gas samples will be collected at sample ports located on the vacuum withdrawal and ozone recirculation manifolds. Samples will be collected in tedlar bags and analyzed for carbon dioxide, oxygen, ozone, VOCs, and methane. Initially, samples will be collected every day at approximately the same time. This frequency can be increased or decreased based on results.

Soil samples will be collected during construction, during ozonation, after ozonation, and at the end of the pilot study. One sample per one thousand tons of soil will be collected from each pile during construction, after ozonation, and for confirmation at the end of the pilot test. These samples will be analyzed for PAHs, TOC, pH, bacterial phospholipid fatty acids PLFA, and microtox. Additionally, soil moisture and soil characterizations may be performed on a limited number of samples.

The ozone treatment/bioremediation process will remove polyaromatic hydrocarbons from the contaminated soil heap according to Table 1, below, while bioremediation alone will have little or no effect on reduction the levels of polyaromatic hydrocarbon in the soil heap.

TABLE 1

Coal Tar Contaminated Soil Cleanup Efficiency

| PAH TYPES | DCV (μg/kg) | INDUSTRIAL (μg/kg) | % REMOVAL |
| --- | --- | --- | --- |
| 2 RINGS | | | 80 |
| Naphthalene | | $3.2 \times 10^7$ | |
| Methylnaphthalene | | I.D. | |
| 3 RINGS | | | 90 |
| Acenaphthylene | | $3.2 \times 10^6$ | |
| Dibenzofuran | | I.D. | |
| Fluorene | | $1.1 \times 10^8$ | |
| Phenanthrene | | $3.2 \times 10^6$ | |
| Anthracene | | $9.0 \times 10^8$ | |
| 4 RINGS | | | 90 |
| Fluoranthene | | $1.1 \times 10^8$ | |
| Pyrene | 1,800 | $6.7 \times 10^7$ | |
| Benzo(a)anthracene | 1,800 | 21,000 | |
| Chrysene | $1.8 \times 10^5$ | $2.1 \times 10^6$ | |
| 5 RINGS | | | 80 |
| Benzoflourenes | 1.8 | | |
| Benzo(a)pyrene | 180 | 2,100 | |
| 6 RINGS | | | 80 |

DCV - dermal contact value
Industrial - June 1994, Michigan Industrial Criteria
Note: default detection limits are often only 330 μg/kg in soil.

The description above has been offered for illustrative purposes only, and it is not intended to limit the scope of the invention of this application which is defined in the following claims.

What I claim is:

1. A method for destroying organic contaminants in organics contaminated soil comprising the steps of;
   (a) forming organic contaminated soil into a soil heap covering one or more ozone recirculation piping systems and one or more vacuum withdrawal piping systems;
   (b) adding a first ozone containing gas stream into the organics contaminated soil heap using one or more ozone recirculation piping systems;
   (c) withdrawing a second gas stream from the contaminated soil heap using one or more ozone vacuum withdrawal piping systems wherein the concentration of ozone in the first ozone containing gas stream is higher than the concentration of ozone in the second ozone containing gas stream;
   (d) admixing the second ozone containing gas stream with ozone from a pressurized ozone source to give the first ozone containing gas stream; and
   (e) recycling the first ozone containing gas stream into the organics contaminated soil.

2. The method of claim 1 wherein the organics contaminated soil contains at least one of the organics contaminants selected from the group consisting of, coal tar, crude oil, refinery intermediates, creosote, kerosene, gasoline, #2 diesel fuel, heating oil, and sludge.

3. The method of claim 1 wherein recycling of the first ozone containing gas stream into the organics contaminated soil heap is halted and microorganisms capable of decomposing residual hazardous organic waste are applied to the soil heap.

4. The method of claim 1 wherein the contaminated soil heap is covered with a gas impervious material before the first ozone containing gas stream is introduced into the organics contaminated soil heap.

5. The method of claim 1 wherein the soil heap formed in step (a) is pretreated by bioremediation before adding the first ozone containing gas steam into the organics contaminated soil in step (b).

6. A method for remediating organics contaminated soil comprising the steps of;
   (a) preparing a first lift of contaminated soil;
   (b) locating a first ozone recirculation piping system on the first lift of contaminated soil;
   (c) placing a second lift of contaminated soil on top of the first ozone recirculation piping system;
   (d) locating a first vacuum withdrawal piping system on top of the second lift of contaminated soil;
   (e) repeating steps (a) through (d) at least once to give an organics contaminated soil heap including a plurality of ozone recirculation piping system and a plurality of vacuum withdrawal piping system;
   (f) injecting a first ozone containing gas stream into the organics contaminated soil heap using the plurality of ozone recirculation piping systems;
   (g) withdrawing a second gas stream from the contaminated soil heap using a plurality of vacuum withdrawal piping systems wherein the concentration of ozone in the first ozone containing gas stream is higher than the concentration of ozone in the second gas stream;
   (h) pressurizing the second gas stream with a recirculation blower;
   (i) admixing the second ozone containing gas stream with ozone from a pressurized ozone source to give the first ozone containing gas stream; and
   (j) directing the first ozone containing gas stream into the contaminated soil heap.

7. The method of claim 6 wherein each ozone recirculation piping system is separated on the vertical from each vacuum withdrawal piping system by from about 3 to about 25 feet.

8. The method of claim 6 wherein the addition of the ozone containing gas is halted and at least one microorganism capable of decomposing hazardous organic contaminants is applied to the soil heap.

9. The method of claim 6 wherein at least one microorganism capable of decomposing hazardous organic contaminants is added to each soil lift and is allowed to react with the hazard organic contaminants for a period of time sufficient to destroy at least some of the hazardous organic contaminants before ozone is injected to the soil heap in step (f).

10. A method for treating soil contaminated with hydrocarbons comprising the steps of;

(a) preparing a first lift of contaminated soil;

(b) locating a first ozone recirculation piping system on the first lift of contaminated soil;

(c) applying at least one microorganism capable of decomposing hydrocarbon contaminants and at least one microorganism nutrient to the first soil lift;

(d) placing a second lift of contaminated soil on top of the first ozone recirculation piping system;

(e) applying at least one microorganism capable of decomposing hydrocarbon contaminants and at least one microorganism nutrient to the second soil lift;

(f) locating a first vacuum withdrawal piping system on top of the second lift of contaminated soil;

(g) repeating steps (a) through (f) at least once to give a hydrocarbon contaminated soil heap including a plurality of ozone recirculation piping systems and a plurality of vacuum withdrawal piping systems;

(h) introducing a first ozone containing gas stream into the contaminated soil heap using the plurality of ozone recirculation piping systems;

(i) withdrawing a second gas stream from the contaminated soil heap using the plurality of vacuum withdrawal piping systems wherein the concentration of ozone in the first ozone containing gas stream is higher than the concentration of ozone in the second ozone containing gas stream;

(j) pressurizing the second gas stream with a recirculation blower;

(k) admixing the second gas stream with ozone from a pressurized ozone source to give the first ozone containing gas stream; and (l) directing the first ozone containing gas stream into the contaminated soil heap.

11. An apparatus for decomposing organic contaminants in a soil heap comprising;

a soil heap including soil and organic contaminants;

at least one ozone recirculation piping system each ozone recirculation piping system having an inlet attached to an ozone recirculation manifold and a plurality of perforated recycle pipe legs wherein all perforated pipe legs are located within the soil heap;

at least one vacuum withdrawal piping system each vacuum withdrawal piping system having a plurality of perforations located inside the soil heap and an outlet attached to a vacuum withdrawal manifold;

a recirculation blower having a blower inlet attached to the vacuum withdrawal manifold and a blower outlet;

a gas recirculation header attached to the blower outlet and attached to the ozone recirculation manifold; and a pressurized source of ozone gas associated with the gas recirculation header.

12. The apparatus of claim 11 wherein the ozone gas recirculation piping system and vacuum withdrawal piping system are constructed of plastic pipes.

13. The apparatus of claim 11 wherein a knockout drum is located in the vacuum withdrawal manifold between the vacuum withdrawal piping system outlet and the recirculation blower inlet.

14. The apparatus of claim 11 wherein a plurality of ozone recirculation piping systems and a plurality of vacuum withdrawal piping system are located in the soil heap in vertically alternating layers.

15. The apparatus of claim 14 wherein each ozone recirculation pipe leg and each vacuum withdrawal pipe leg terminates at a distance between about 0.5 meters to about 2.0 meters from any edge of the soil heap.

16. The apparatus of claim 11 wherein the recirculation blower delivers from about 0.01 scfm/ton of soil to about 0.20 scfm/ton of soil at a pressure ranging from about 10" to about 60" of water.

17. The apparatus of claim 11 wherein the soil heap is covered by a material selected from the group consisting of synthetic impervious materials and clay.

18. The apparatus of claim 11 including a carbon absorption unit associated with the gas recirculation header.

19. An apparatus for decomposing organic contaminants in a soil heap comprising;

a soil heap including soil, organic contaminants, at least one nutrient, and at least one microorganism capable of decomposing organic contaminants;

at least one ozone recirculation piping system, each ozone recirculation piping system having an inlet attached to an ozone recirculation manifold and a plurality of perforated recycle pipe legs wherein all perforated pipe legs are located within the soil heap;

at least one vacuum withdrawal piping system, each vacuum withdrawal piping system having a plurality of perforations located inside the soil heap and an outlet attached to a vacuum withdrawal manifold;

a recirculation blower having a blower inlet attached to the vacuum withdrawal manifold and a blower outlet;

an gas recirculation header attached to the blower outlet and to the ozone recirculation manifold; and a pressurized source of ozone gas associated with the gas recirculation header.

* * * * *